United States Patent [19]
Pigeon

[11] 3,881,259
[45] May 6, 1975

[54] LEVEL INDICATING DEVICE
[76] Inventor: Gérard Pigeon, 271 Quintal St., Laval-Des-Rapides, Quebec, Canada
[22] Filed: Aug. 7, 1973
[21] Appl. No.: 386,344

[52] U.S. Cl. ................................................. 33/397
[51] Int. Cl............................................... G01c 9/14
[58] Field of Search ............ 33/391, 396, 397, 399, 33/400, 401, 402, 333, 370, 371, 372, 373, 385, 386

[56] References Cited
UNITED STATES PATENTS

| | | | |
|---|---|---|---|
| 354,592 | 12/1886 | Brown | 33/373 X |
| 609,395 | 8/1898 | Atwood | 33/397 |
| 2,350,103 | 5/1944 | Fanger | 33/397 X |
| 3,336,679 | 8/1967 | Davis | 33/397 X |

Primary Examiner—Richard E. Aegerter
Assistant Examiner—Charles E. Phillips

[57] ABSTRACT

A device to indicate the level and off-level condition of an object by a simple sighting including a base, a universal pivot carried by the base and defining a universal pivot center, a needle member pivoted at one end onto the universal pivot and having the other end forming an indicator, a sight arranged adjacent the indicating end of the needle member and having a line of sight extending through the pivot center, and a tubular enclosure surrounding the needle member and fully enclosing the latter for protection against hindrance of the universal pivot by the ingress of particles. The base includes a mounting plate provided with adjustable elements to adjustably secure the device against the side of the body, the level of which is of interest.

7 Claims, 7 Drawing Figures

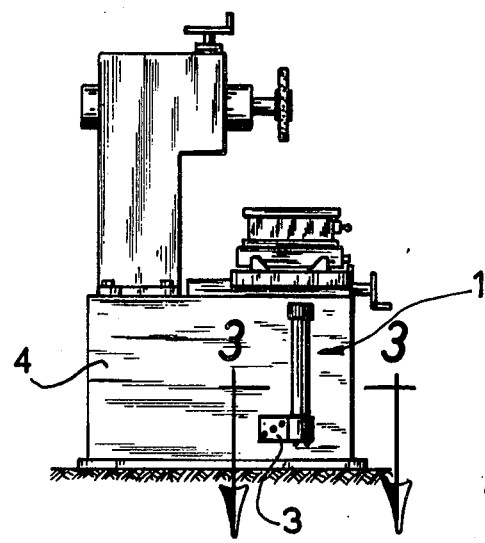
FIG.1
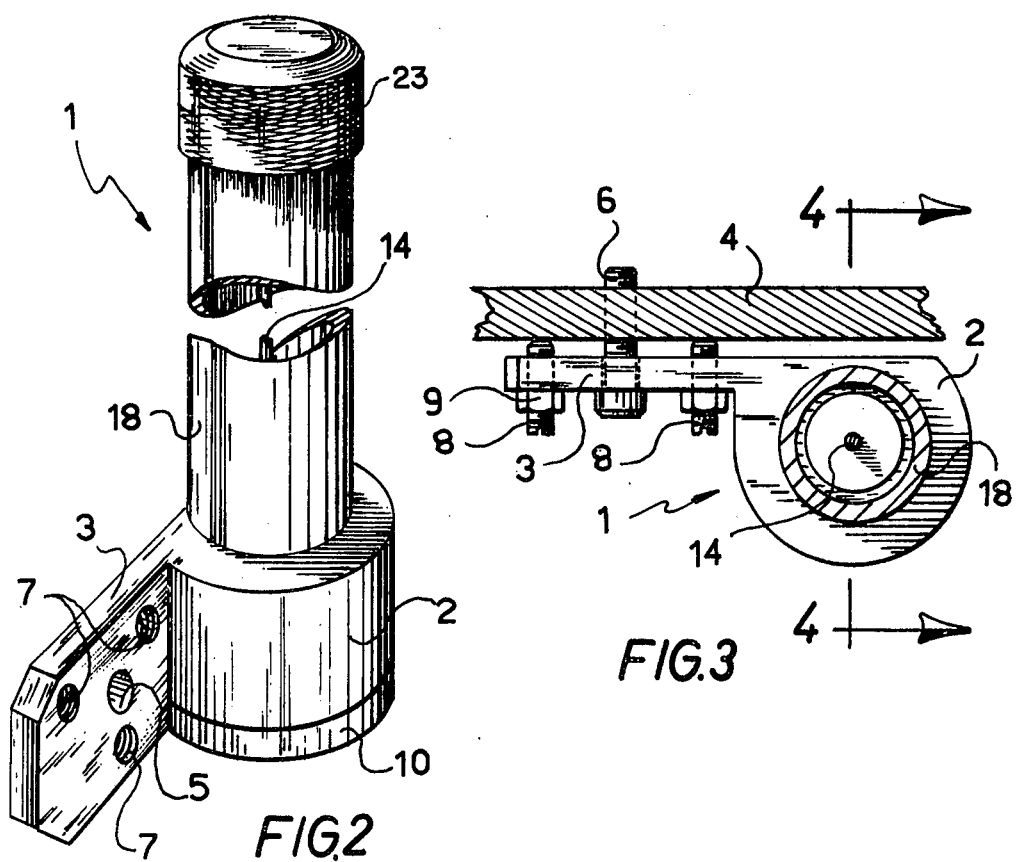
FIG.2
FIG.3

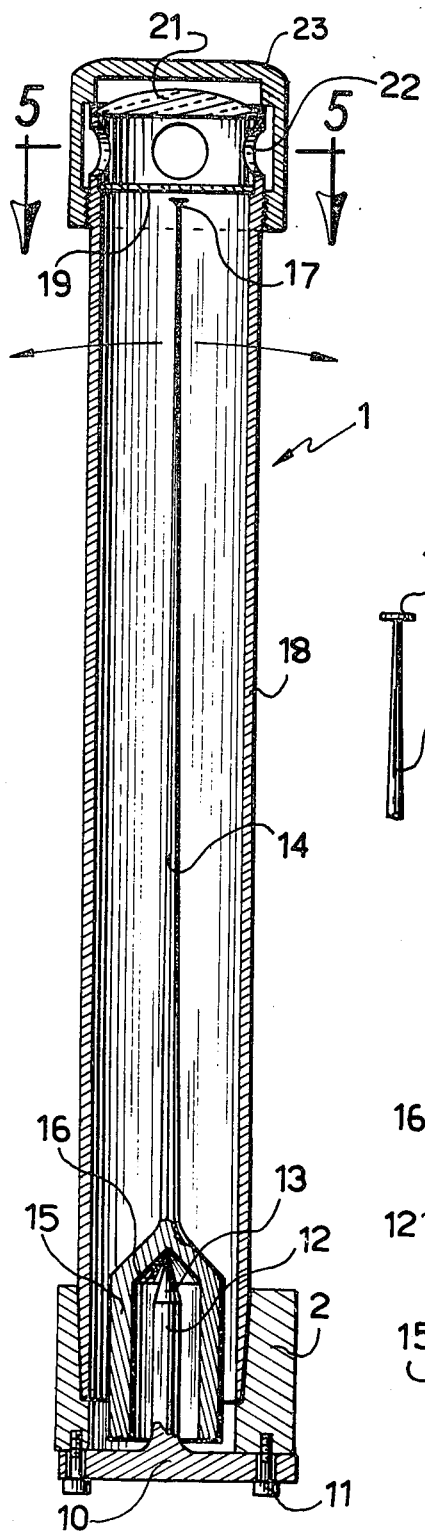
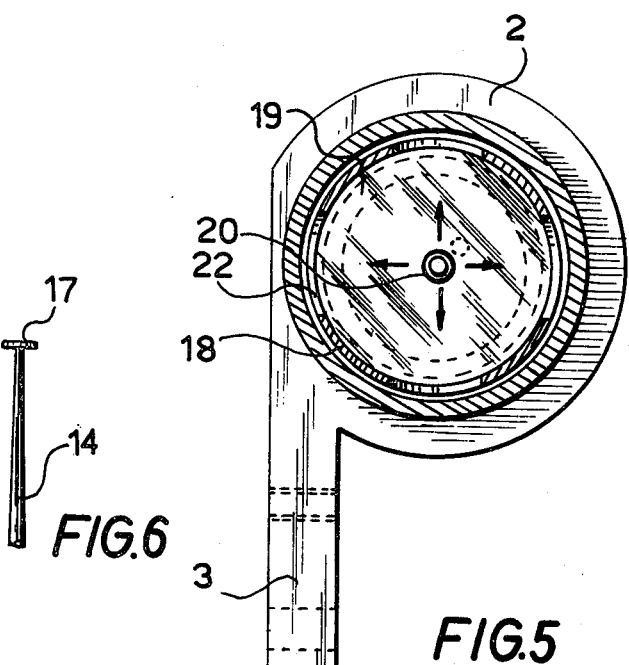
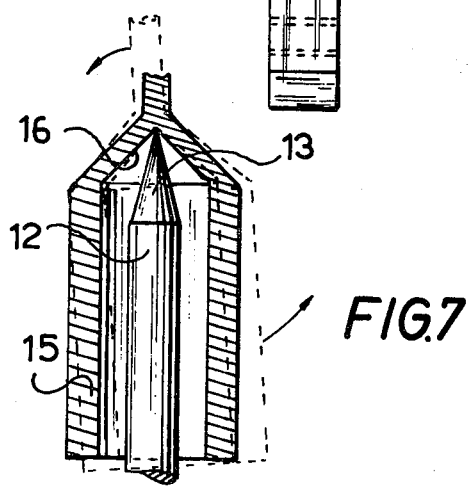

LEVEL INDICATING DEVICE

This invention relates to level instruments and, more particularly, to a level indicating device of the type including a needle member operatively pivoted above its center of gravity.

Various level indicating devices of the above type have been proposed so far, the most pertinent thereof comprising a needle member which is universally pivoted above its center of gravity. This previously proposed level indicating device is essentially constructed to check the level indication by looking transversely of the needle member and such that the user has to displace himself about 180° around the device in order to properly verify and obtain the level position. There results a serious limitation in the convenience of such level device, since it is often impossible or difficult to have 180° sighting access to the level indicating device and furthermore, since many sightings are required, the checking and adjustment are relatively time-consuming.

The above-mentioned level indicating device of the prior art also includes a tubular enclosure surrounding the needle member and having sighting apertures through the lateral wall thereof above the universal pivot means which includes an upwardly directed conically shaped cavity.

There results that undesirable particles may find their way to the conical cavity and hinder the free pivoting of the needle member.

The applicant proposes a level indicator device of the above type in which a main object is that the sighting is done in one direction only, always along a line of sight passing through the universal pivot center and lengthwise of the needle member for a more convenient usage.

It is another important object of the invention to provide a level indicating device with a needle member and a universal pivot means which are arranged within an enclosure and construction for minimized hindrance of the universal pivot by access of undesirable particles thereto.

It is another and general object of the invention to provide a level indicating device of the above type, which is of relatively simple, sensitive and yet rugged construction.

It is a further object of the invention to provide a level indicating device of the above type with adjustable elements to adjustably secure the same against the side of a body, the level of which is to be determined and/or corrected.

The above and other objects and advantages of the invention will be better understood in the light of the following detailed description of a preferred embodiment thereof which is illustrated, by way of example only, in the accompanying drawings, in which:

FIG. 1 is an elevation view of a machine tool with a level indicating device according to the invention secured to the base thereof;

FIG. 2 is a perspective view of a level indicating device according to the invention;

FIG. 3 is a cross-sectional view as seen along line 3—3 in FIG. 1;

FIG. 4 is a cross-sectional view as seen along line 4—4 in FIG. 3;

FIG. 5 is a cross-sectional view as seen along line 5—5 in FIG. 4 illustrating in enlarged scale the level indicating sight;

FIG. 6 is an enlarged scale view of the indicating end of the needle according to the invention; and FIG. 7 is an enlarged scale view of the universal pivot assembly forming part of the level indicating device according to the invention.

The illustrated level indicating device 1 according to the invention includes a base composed of two parts, the first part forming a cylindrical body 2 having a tangential plate extension 3 adapted to be secured against the side of a body to find the level thereof. Such body may, for instance, be a machine tool 4, of any type. The plate extension 3 is formed with a central bore 5 adapted for the free insertion of a bolt 6 therein to secure the level indicating device 1, for instance against the machine tool 4 while allowing some pivoting relative to the latter. A set of three threaded bores 7 are provided around the central bore 5 for the insertion of levelling screws 8 therein. Locking nuts 9 are provided around the locking screws 8 to securely tighten the latter in the desired position.

The cylindrical body 2 is closed at one end by the second part of the base, namely a disc or circular plate 10 laterally adjustably secured thereto by any suitable expedient, such as by bolts 11, as shown in FIG. 4 which extend through bores of disc 10 of greater diameter than that of bolts 11. The end plate 10 has a stud 12 integrally formed therewith and operatively projecting upwardly therefrom. The stud 12 has a free end 13 which is conically pointed to form a universal pivot defining a pivot center.

A needle member 14 includes a lower end forming a skirt portion 15 defining a conical recess 16 adapted for pivotal engagement of the conically pointed end 13 therein. The needle member 14 terminates into an upper end forming an indicating disc 17 extending transversely of the length of the needle member. The latter has a center of gravity operatively standing below the pivot center defined by the conically pointed end 13.

A tubular enclosure 18 is secured at one end into the cylindrical body 2 and surrounds the needle member 14. A transparent plate 19 is secured at the upper end of the tubular enclosure 18 and forms with the latter and the bottom disc 10 a closed chamber for the needle member 14. The transparent plate 19 is provided with an inscribed circular mark 20 arranged for registry of the indicating disc 17 therewith when the device is in level position. The second part of the base, i.e. the plate 10, is laterally and adjustably secured to the first part of the base, as mentioned, by bolts 11, in order to obtain fine adjustment of the indicating disc 17 relative to the circular mark 20.

A lens 21 is secured endmost of the tubular enclosure 18 relative to the transparent plate 19 and apertures 22 extend through the tubular enclosure to provide illumination of the transparent plate 19 and the indicating disc 17. A cap 23 closes the upper end of the tubular enclosure 18 to protect the lens 21 and close the apertures 22 against ingress of dirt or dust therethrough and access to the lens 21.

The transparent plate 19 with the circular mark 20 form a level indicating sight to see the indicating disc 17 and having a line of sight passing through the pivot center defined by the pointed end 13.

The needle member 14 is preferably of non-magnetizable material to prevent undue influence of any magnetic field, such as for instance may be produced by the machine tool 4 or other machines against which the device 1 may be secured.

The level indicating device 1 may be used merely to indicate the level by positioning the extension 3 flat against the object concerned. The level indicating device 1 may be used to monitor the level position of an object, such as a machine 4, by first giving the desired position to the machine, that is where it operates more satisfactorily. Normally, such position of optimum performance should be the level position of the machine. The device 1 is then secured against one side of the machine by screw 6. Thereafter, the levelling screws 8 are adjusted until the extension 3 adopts the position in which the needle 14 has its indicating disc 17 nearly centered within the circular mark 20. The screw 6 is then securely tightened. Finally, disc 10 is laterally adjusted to perfectly center disc 17 with mark 20. Screws 8 are for a coarse adjustment while bolts 11 are for a fine adjustment.

If the machine loses its best or preferred position, the same may be easily recaptured by adjusting the level of the machine so that the disc 17 returns to the centered position.

As a modification, disc 17 can be eliminated and needle 14 provided with a flat end, while circular mark 20 is replaced by a circular dot having a diameter equal to the diameter of the flat end of modified needle 14.

I claim:

1. A level indicating device comprising a base consisting of a first part and of a second part, a universal pivot means carried by said second part of said base and defining a universal pivot center, a needle member having a pivot portion and an indicating end portion, said pivot portion resting onto said universal pivot means with the center of gravity of said needle member operatively standing below the pivot center of said universal pivot means, a level indicating sight carried by said first part and extending adjacent said indicating end portion and having a line of sight extending substantially through said pivot center and arranged for displaying to a viewer to said sight all departures of said indicating end portion in any direction relative to said line of sight, said second part being laterally and adjustably secured to said first part for adjustment of said indicating, end portion relative to said level indicating sight, a plate extension secured to said first part of said base for attaching said device to an object, the level of which is to be monitored, and adjustment means engaging plate extension and constructed and arranged to produce levelling of said plate extension relative to said object.

2. A level indicating device as defined in claim 1, wherein said level indicating sight includes a window having a transparent element extending transversely adjacent said indicating end portion and a marking operatively associated to said transparent element and arranged into said line of sight for registering with said indicating end portion when the device is in level position.

3. A level indicating device as defined in claim 2, wherein said marking constitutes an inscribed circle onto said transparent element and said indicating end portion has a tip forming a disc extending coaxial with said line of sight and arranged to register with said circle when said device is in level position.

4. A level indicating device as defined in claim 3, further including a tubular enclosure surrounding said needle member, extending lengthwise thereof, and secured at one end to said first part of said base around said universal pivot means and said transparent element closes the other end of said tubular enclosure and forms a closed compartment with the latter and said base.

5. A level indicating device as defined in claim 4, wherein said universal pivot means constitutes a stud operatively extending upright from said second part of said base and having a conically pointed free end defining said pivot center, and said needle member has a lower end constituting said pivot portion and forming a skirt portion defining an operatively downwardly opening conical recess and resting over said stud with said conically pointed end engaging into said conical recess.

6. A level indicating device as defined in claim 4, wherein said transparent element constitutes a transparent plate extending transversely within said tubular enclosure, a lens is secured to said other end of said tubular enclosure endmost relative to said transparent plate, said tubular enclosure includes light access apertures formed therethrough between said transparent plate and said lens, and a cap is constructed and arranged to engage over said other end to protect said lens and close said light access apertures.

7. A level indicating device comprising a base, a mounting plate carried by said base and adapted to be pivotally secured to an object, the level of which is to be monitored, adjustment means mounted onto said mounting plate and arranged to engage said object and adjust the position of the device relative thereto, a universal pivot means carried by said base and defining a universal pivot center, a needle member having a pivot portion and an indicating end portion, said pivot portion resting onto said universal pivot means with the center of gravity of said needle member operatively standing below the pivot center of said universal pivot means, a tubular enclosure surrounding said needle member extending lengthwise thereof and secured at one end to said base around said universal pivot means, a window having a transparent element closing the other end of said tubular enclosure and forming a closed compartment with the latter and with said base, said transparent element extending transversely adjacent said indicating end portion, a marking consisting of an inscribed circle on said transparent element, said indicating end portion having a tip forming a disc extending coaxial with said needle member and arranged to register with said circle when said device is in level position, said tubular enclosure extending beyond said transparent element, a lens secured to the other end of said tubular enclosure and most relative to said transparent element, said tubular enclosure including light access apertures formed therethrough between said transparent element and said lens, a cap removably engaging said other end of said tubular enclosure to protect said lens and close said light access apertures, said universal pivot means constituting a stud operatively extending upright from said base and having a conically pointed free end defining said pivot center, said needle member having a lower end constituting said pivot portion and forming a skirt portion defining an operatively downwardly opening conical recess resting on said stud with said conically pointed end engaging within said conical recess.

* * * * *